(12) United States Patent
Kumpf et al.

(10) Patent No.: US 7,293,818 B2
(45) Date of Patent: Nov. 13, 2007

(54) SEAT FOR ARMORED VEHICLE

(75) Inventors: Bernhard Kumpf, Fischamend (AT); Anton Strassgürtl, Schwadorf (AT); Gerhard Skoff, Vienna (AT)

(73) Assignee: Steyr-Daimler-Puch Spezialfahrzeug GmbH, Vienna (AT)

( * ) Notice: Subject to any disclaimer, the term of this patent is extended or adjusted under 35 U.S.C. 154(b) by 153 days.

(21) Appl. No.: 11/126,383

(22) Filed: May 6, 2005

(65) Prior Publication Data

US 2005/0264082 A1 Dec. 1, 2005

(30) Foreign Application Priority Data

May 6, 2004 (AT) ................................ A 776/2004

(51) Int. Cl.
*B60N 2/42* (2006.01)
(52) U.S. Cl. ................ 296/68.1; 297/216.17; 244/122 R
(58) Field of Classification Search ............ 297/216.1, 297/216.15, 216.16, 216.19, 801.1, 805, 297/470–472, 216.17; 296/68.1, 65.05, 75; 280/801.1, 805; 244/122 R, 122 B
See application file for complete search history.

(56) References Cited

U.S. PATENT DOCUMENTS

| | | | |
|---|---|---|---|
| 2,507,609 A * | 5/1950 | Miles .................... 297/423.26 |
| 2,829,702 A | 4/1958 | Keating |
| 3,314,720 A * | 4/1967 | Millington et al. ...... 297/216.1 |
| 3,868,143 A | 2/1975 | Reilly |
| 3,982,787 A * | 9/1976 | Moll .......................... 297/317 |
| 4,523,730 A * | 6/1985 | Martin ................... 244/122 R |
| 4,638,510 A * | 1/1987 | Hubbard ........................ 2/6.1 |
| 4,854,608 A * | 8/1989 | Barral ....................... 280/805 |
| 6,378,939 B1 * | 4/2002 | Knoll et al. ............. 297/216.1 |
| 6,394,393 B1 * | 5/2002 | Mort ...................... 244/122 R |
| 6,755,463 B2 * | 6/2004 | Lardieri et al. ............... 297/35 |
| 6,820,931 B2 * | 11/2004 | Ruff et al. ............. 297/216.17 |
| 6,913,314 B2 * | 7/2005 | Hansen .................... 297/216.1 |

FOREIGN PATENT DOCUMENTS

| | | |
|---|---|---|
| DE | 43 03 719 | 8/1994 |
| EP | 1 382 932 | 1/2004 |

\* cited by examiner

*Primary Examiner*—Dennis H Pedder
*Assistant Examiner*—Melissa Black
(74) *Attorney, Agent, or Firm*—Andrew Wilford

(57) ABSTRACT

An armored vehicle having a floor, a roof above the floor, and a side wall extending vertically between the floor and the wall, is provided with a seat having a rigid frame, at least one ceiling mount suspending the frame from the roof, a cover on the frame forming surfaces adapted to hold a seated occupant, a harness on the frame retaining the occupant seated on the cover. The frame and cover is wholly disengaged and disconnected from the floor. The cover includes an upright back panel engaging a back of the occupant of the seat, a seat panel engaging underneath and supporting the occupant of the seat, and a pair of side panels flanking the occupant of the seat and connected to the back panel and seat panel.

14 Claims, 4 Drawing Sheets

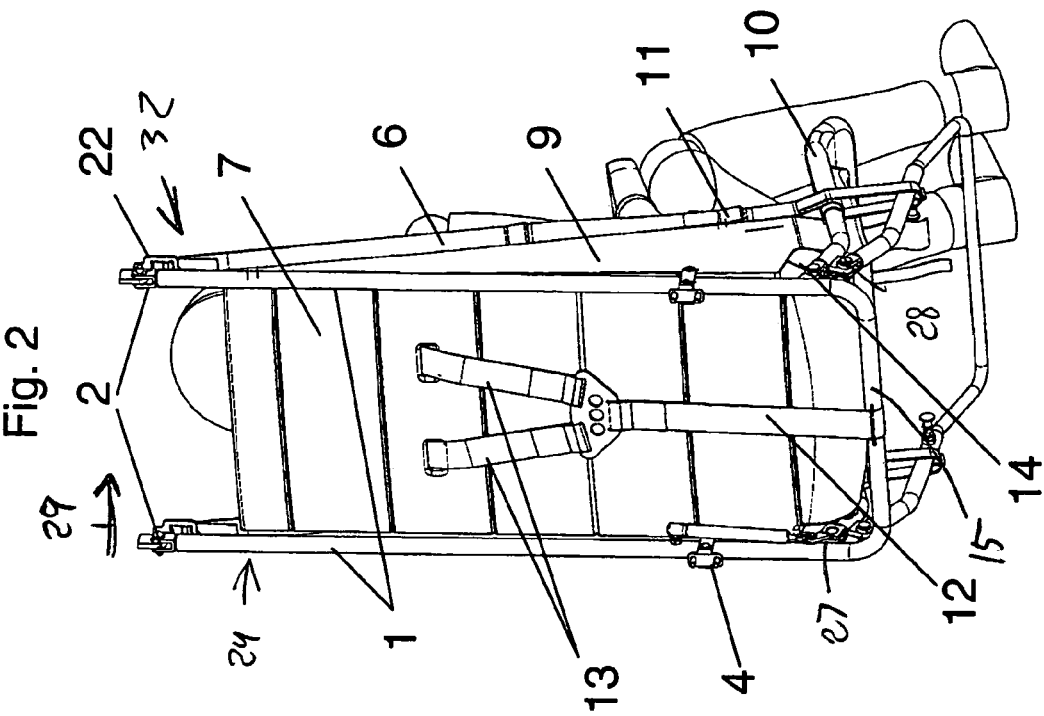
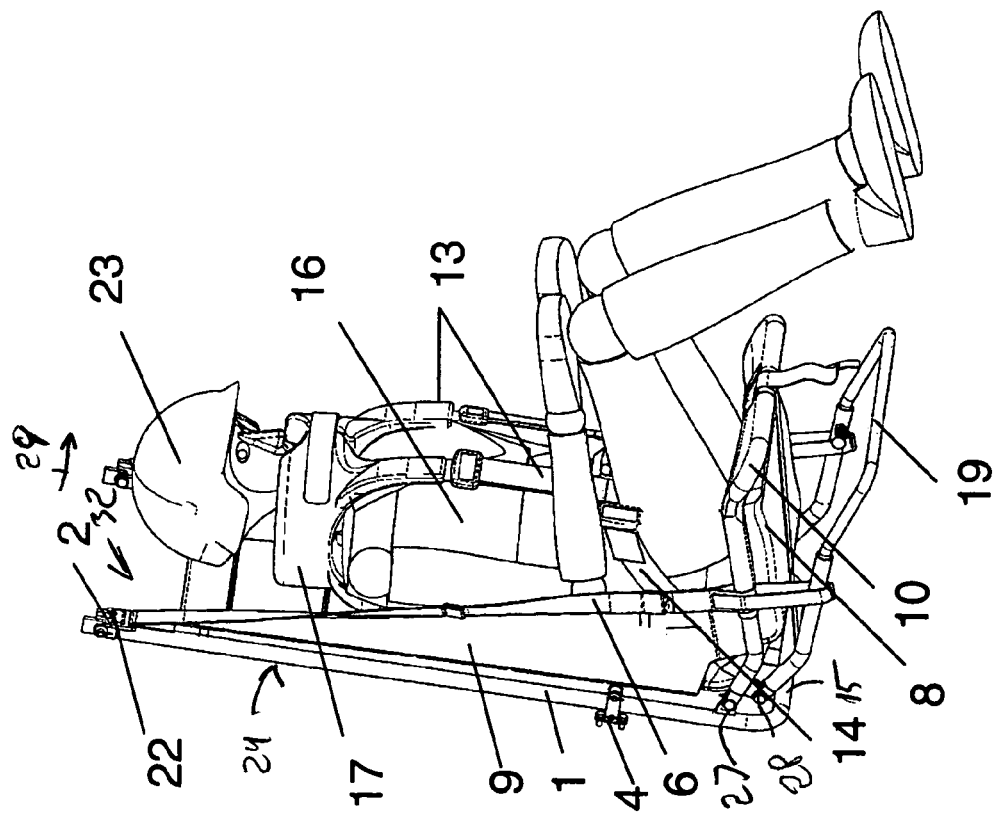

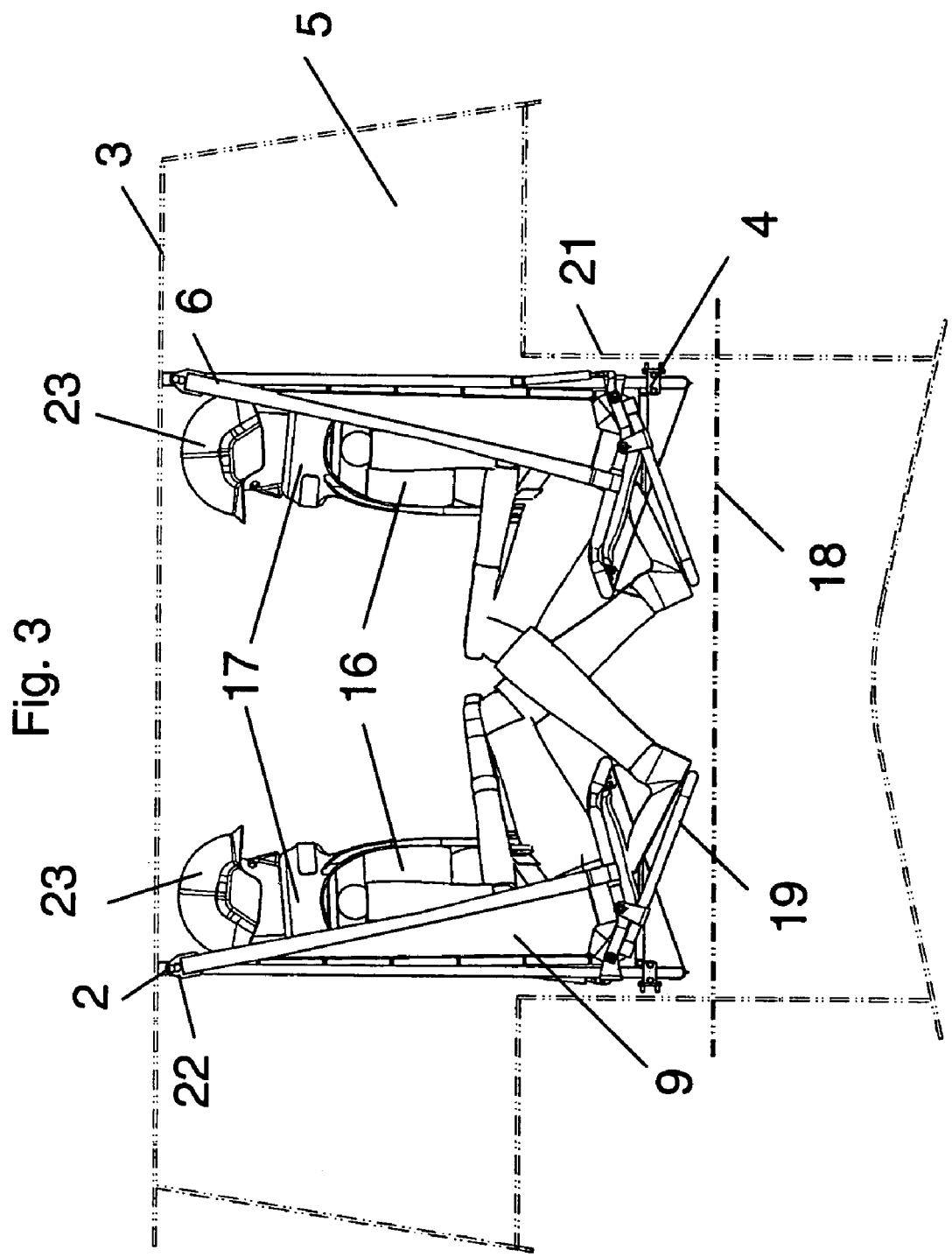

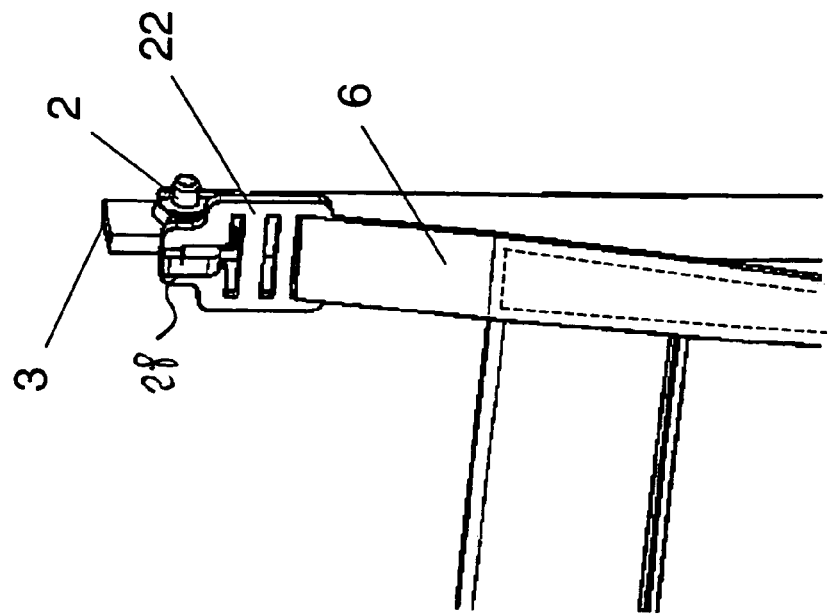
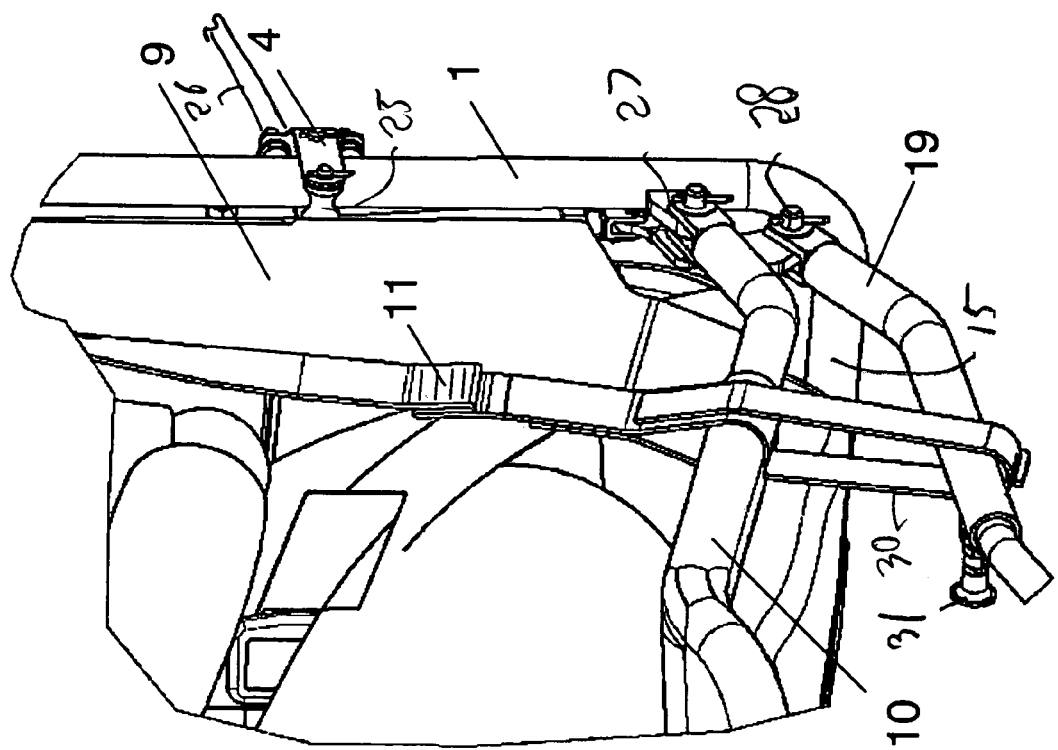

SEAT FOR ARMORED VEHICLE

FIELD OF THE INVENTION

The present invention relates to a seat. More particularly this invention concerns a seat for a passenger in an armored vehicle.

BACKGROUND OF THE INVENTION

An armored vehicle is typically used to transport passengers through regions where a significant problem is land mines that can explode next to or underneath the vehicle. The passengers need to be accommodated in seats in which they can sit with some degree of comfort and which normally also can easily be moved out of the way in case the vehicle is being used to transport freight. In addition it is important that the use of the seat not increase the danger to the passenger, and even that it somewhat increase his or her protection.

It has been suggested, for example in EP 1,382,932, DE 4,303,701, U.S. Pat. Nos. 2,829,702, and 3,868,143, to mount the seat so that it does not sit directly on the floor. Instead it is secured by straps or cables to the vehicle ceiling and to the floor. The advantage of this construction is that, during normal use, the seat is solidly held in place and functions much like a standard seat, but if a land mine explodes underneath the vehicle and blows up its floor, this upward movement of the floor is not transmitted directly to the seat. Instead the flexible connection to the floor merely goes slack and the floor is free to move upward somewhat.

The disadvantage of these systems is that, once the floor had been blown upward somewhat, the entire mounting assembly of the seat becomes ineffective. The seat is free to swing horizontally and, more importantly to move upward. Thus the explosion underneath the vehicle makes it possible for the seat to move upward toward the car roof, which is a highly undesired effect as it can lead to serious head injuries as the seat and its occupant slam into the roof.

OBJECTS OF THE INVENTION

It is therefore an object of the present invention to provide an improved seat for an armored vehicle.

Another object is the provision of such an improved seat for an armored vehicle that overcomes the above-given disadvantages, in particular that offers excellent protection against land mines under the vehicle and that can still be stowed in a very small space.

SUMMARY OF THE INVENTION

An armored vehicle having a floor, a roof above the floor, and a side wall extending vertically between the floor and the roof is provided with a seat having according to the invention a rigid frame, at least one ceiling mount suspending the frame from the roof, a cover on the frame forming surfaces adapted to hold a seated occupant, a harness on the frame retaining the occupant seated on the cover. The frame and cover is wholly disengaged and disconnected from the floor.

With this system, therefore, any movement of the floor would not be transmitted to the seat, and also would not affect the anchoring or mounting of the seat. Since the primary danger in an armored vehicle to its passengers is from a landmine that explodes underneath it, the instant invention provides a particularly effective means of protecting the vehicle's occupants.

According to the invention the cover includes an upright back panel engaging a back of the occupant of the seat, a seat panel engaging underneath and supporting the occupant of the seat, and a pair of side panels flanking the occupant of the seat and connected to the back panel and seat panel. In addition the frame includes a generally upright back part carrying the back panel and a rigid seat part pivoted at a lower end of the back part and carrying the seat panel. A pair of elastic straps extending along the side panels have upper ends secured to an upper part of the back frame part and lower ends secured to the seat part. These straps are stitched to the side panels, and each of the straps has an S-shaped loop fastened together to tear open when the strap is tensioned beyond a predetermined limit.

The frame according to the invention further comprises a rigid footrest part pivoted at a lower end of the back part underneath the seat part. This footrest part has a telescoping front extension.

In accordance with the invention at least one side-wall mount fixed on the vehicle side wall engaging the frame permits vertical movement of the frame relative to the side wall and blocks horizontal movement of the frame relative to the side wall. This side wall mount can include a roller engaging the frame. It can also be provided with straps securing it to the side wall.

The ceiling mount according to the invention is a hinge defining a horizontal pivot axis. The harness includes shoulder straps engageable around shoulders of the user in the seat and a lap belt engageable around the lap of the user in the seat. A protective collar on the shoulder straps engages around a neck region of the user in the seat. This collar is releasably secured to the shoulder straps and is made of plastic foam.

BRIEF DESCRIPTION OF THE DRAWING

The above and other objects, features, and advantages will become more readily apparent from the following description, reference being made to the accompanying drawing in which:

FIGS. 1 and 2 are perspective views from the front and back of the seat according to the invention;

FIG. 3 is a small-scale end view showing seats in accordance with the invention in a vehicle;

FIGS. 4 and 5 are large-scale views of details of the invention; and

SPECIFIC DESCRIPTION

Figure 7:
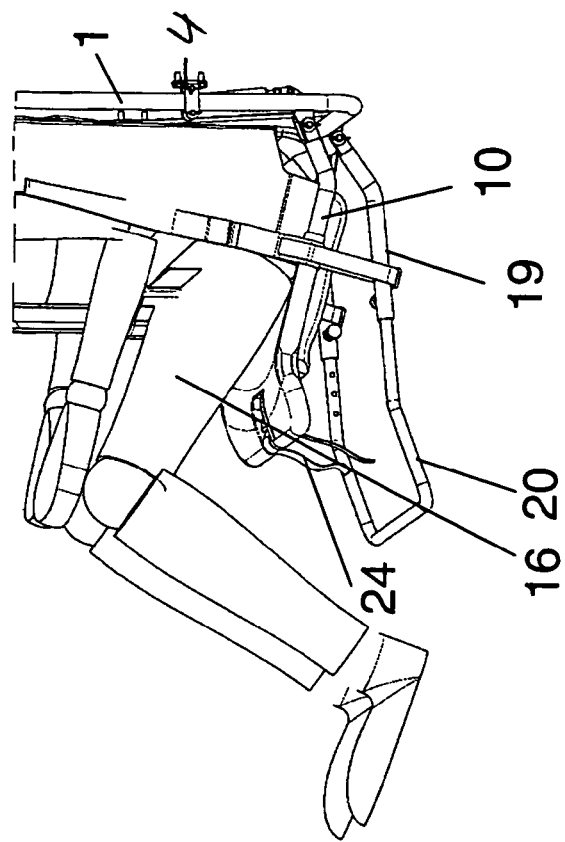
FIGS. 6 and 7 are views showing two different positions of the foot rest of the seat according to the invention.
Figure 6:
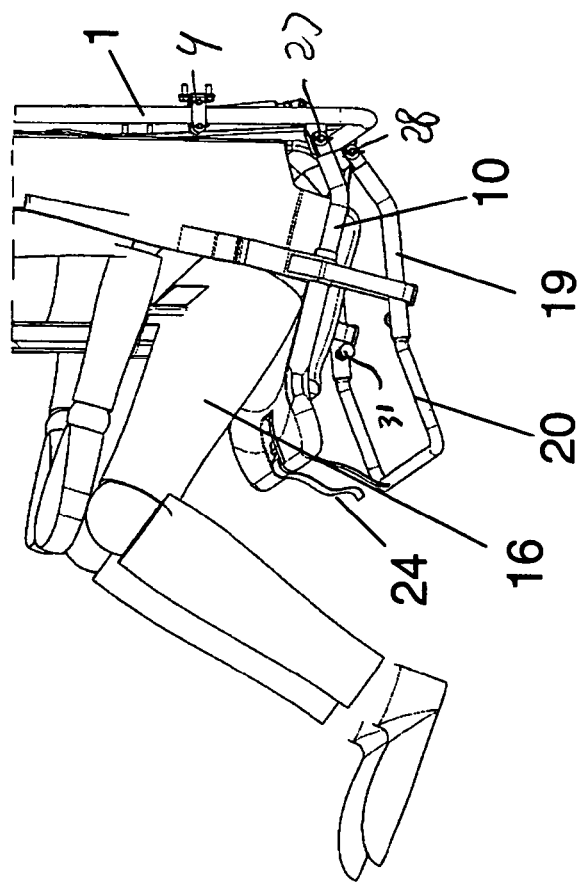

As seen in FIGS. 1 and 2, a seat 32 according to the invention has a rigid U-shaped frame 24 formed by a pair of tubular and normally vertical side members or tubes 1 interconnected at their lower end by a connecting member or tube 15, all made of aluminum.

As shown in FIG. 3, seats 32 according to the invention are intended for use in an armored vehicle 5 having a floor 18, a roof 3, and side walls 21 extending vertically between the floor 18 and roof 3. They are typically lined up along the side walls 21 with occupants 16 of the seats 32 facing each other.

Upper ends of the side members 1 are secured by hinge-like mounts 2 to the roof 3 so that the frame 24 hangs from the roof 3 and is according to the invention not connected in any way to the floor 18. The seat 32 is in effect a swing that, if not restrained as described immediately below, is pivotal about an axis that extends horizontally parallel to the normal vehicle travel direction 29.

In addition as shown in FIG. 4, the side members 1 are each connected by a respective mount 4 to the respective side wall 21. These mounts 4 are provided with rollers 25 so that the respective members 1 can freely move up and down in them, but the mounts 4 effectively block the tubes 1 against horizontal movement, both in and perpendicular to the vehicle travel direction 29. The mounts 4 can be bolted directly to the side walls 21 or secured by diagonal and inextensible straps 26 thereto.

The frame 24 further includes a U-shaped seat frame 10 pivoted at hinges 27 at the lower ends of the members 1 for movement between the illustrated down position in which it is generally horizontal and extends transversely away from the generally vertical plane of the members 1 and an up stowed position lying flat against the member 1. A pair of strong and somewhat elastic straps 6 have upper ends looped through fittings 22 engaged as shown in FIG. 5 over hooks 28 on the mounts 2 and lower ends looped as shown in FIG. 4 around the side members of the seat frame 10. An unillustrated light spring, e.g. an elastic cord, normally pulls the seat frame 10 into the stowed position. Each strap 6 further has between its ends an S-shaped loop 11 that is stitched together and that forms a release point so that, if the strap 6 is tensioned beyond a predetermined limit, the loop 11 will tear open, thereby lengthening the strap 6 and dissipating energy as will be described below.

Below each U-shaped seat frame 10 there is a similar U-shaped aluminum-tubing footrest frame 19 pivoted at hinges 28 below the hinges 27 for swinging about a horizontal axis below that of the hinges 27 and parallel to the vehicle travel direction 29. Extension loops 30 at the lower ends of the straps 6 engage around the side members of this frame 19 to limit its downward pivoting, and it can be swung up against the side members 1 of the frame 24 like the seat frame 10. The footrest frame 19 has a U-shaped telescoping front part 20 that can be pulled out as shown in FIG. 7 and locked in place by a latch 31. When fully extended as shown in FIG. 7, the part 20 can support the feet of the user in the seat 32, but when space is limited as shown in FIG. 3, the part 20 is not extended so that a user in an opposite or confronting seat 32 can rest his or her feet on it. In any case during use no part of the seat 32 and no part of an occupant 16 of the seat 32 touches the vehicle floor 18. A hook-and-barb or Velcro® strap 24 fixed to the crosspiece of the seat frame 10 can be wrapped around the crosspiece of the frame 10 to hold it out of the way up against the frame 10 when not in use.

The seat 32 according to the invention has a cover comprised of a back panel 7 that is spanned between the side members 1 of the frame 24 and that extends up to the head level, or even the level of a helmet 23 worn by the user 16 of the seat 32. It also has a seat panel 8 spanned between the side members of the seat frame 10, and side panels 9 that extend forward from side edges of the back panel 7 and that have lower edges secured to outer edges of the seat cover 8.

The user is held in place by a harness including suspender-type shoulder straps 13 and a lap belt 14. A strap 12 from the ends of the shoulder straps 13 passes underneath the crosspiece 15 and connects to the seat belt 14, so that the user is solidly held in the seat 32. A plastic-foam collar 17 is secured to the shoulder straps 13 and engages around and in front of the head of the chair occupant 16 to protect him or her from side whiplash injuries.

With the seat 32 according to the invention, when for instance a mine explodes underneath the vehicle 5, the floor 18 will typically be driven up and even plastically deformed. Since neither the seat 32 nor the seat's occupant 16 is touching this floor 18, no force will be transferred from the floor 18. In addition since the seat 32 is not attached or anchored to the floor at all, upward deformation of the floor 18 will not impair the mounting of the seat 32, which is wholly suspended from the roof 3 and held in place by the side wall 21.

During such an explosion underneath the vehicle 5, in addition to the floor 18 being upwardly deformed, the entire vehicle 5 is typically driven upward. This will of course upwardly entrain the seat 32 and its occupant 16. The initial acceleration is absorbed by stretching of the straps 6, thereby dissipating part of the energy. Further energy can be dissipated by tearing-open of the loops 11, and finally by tearing of the side panels 9. Even if the entire seat 32 continues to be driven upward, the occupant 16 is harnessed to the rigid frame 24 which will hold him or her down away from the roof 3. Even if the upward force is considerable, it will have to deform the rigid frame 24 before the user's head comes into contact with the roof 3.

We claim:

1. In an armored vehicle having a floor, a roof above the floor, and a side wall extending vertically between the floor and the roof, a seat comprising:
   a rigid frame having a generally upright back part and a horizontal seat part;
   a hinge between the seat part and a lower end of the back part;
   a means including at least one ceiling mount connected to an upper end of the back part and suspending the frame from the roof;
   straps connected to the ceiling mount and to the seat part for suspending the seat part from the ceiling mount;
   a cover on the parts of the frame forming surfaces adapted to hold an occupant seated on the seat part;
   a harness on the frame retaining the occupant seated on the cover, the frame and cover being wholly disengaged and disconnected from the floor; and
   at least one side-wall mount fixed on the vehicle side wall engaging the frame, permitting vertical movement of the frame relative to the side wall, and blocking horizontal movement of the frame relative to the side wall.

2. The armored-vehicle seat defined in claim 1 wherein the cover includes
   an upright back panel on the back part and engaging a back of the occupant of the seat,
   a seat panel on the seat part engaging underneath and supporting the occupant of the seat, and
   a pair of side panels on the back part flanking the occupant of the seat and connected to the back panel and seat panel.

3. The armored-vehicle seat defined in claim 2 wherein the straps are stitched to the side panels.

4. The armored-vehicle seat defined in claim 1 wherein each of the straps has an S-shaped loop fastened together to tear open when the strap is tensioned beyond a predetermined limit.

5. The armored-vehicle seat defined in claim 1 wherein the frame further comprises a rigid footrest part pivoted at a lower end of the back part underneath the seat part.

6. The armored-vehicle seat defined in claim 5 wherein the footrest part has a telescoping front extension.

7. The armored-vehicle seat defined in claim 1 wherein the side-wall mount includes a roller engaging the frame.

8. The armored-vehicle seat defined in claim 1 wherein the side-wall mount is provided with straps securing the back part to the side wall and permitting vertical movement of the back part relative to the side wall.

9. The armored-vehicle seat defined in claim 1 wherein the ceiling mount is a hinge defining a horizontal pivot axis.

10. The armored-vehicle seat defined in claim 1 wherein the harness includes
   shoulder straps engageable around shoulders of the user in the seat, and
   a lap belt engageable around the lap of the user in the seat.

11. The armored-vehicle seat defined in claim 10, further comprising
   a protective collar on the shoulder straps engageable around a neck region of the user in the seat.

12. The armored-vehicle seat defined in claim 11 wherein the collar is releasably secured to the shoulder straps.

13. The armored-vehicle seat defined in claim 11 wherein the collar is of plastic foam.

14. In an armored vehicle having a floor, a roof above the floor, and a side wall extending vertically between the floor and the roof, a seat comprising:
   a rigid frame having
      a normally vertical back part with two upright, rigid, and generally parallel side members and a cross piece extending horizontally between the side members, and
      a normally horizontal seat part pivoted at and extending horizontally from a lower end of the back part;
   a means including a pair of ceiling hinges connected to upper ends of the side members and suspending the frame from the roof;
   respective side straps extending between the ceiling hinges and the seat part and thereby suspending the seat part from the roof;
   at least one side-wall mount fixed on the vehicle side wall engaging the frame, permitting vertical movement of the frame relative to the side wall, and blocking horizontal movement of the frame relative to the side wall;
   a cover including
      an upright back panel engaging a back of the occupant of the seat,
      a seat panel engaging underneath and supporting the occupant of the seat, and
      a pair of side panels flanking the occupant of the seat and connected to the back panel and seat panel;
   elastic straps extending between upper ends of the side members and the frame seat part; and
   a harness on the frame retaining the occupant seated on the cover, the frame and cover being wholly disengaged and disconnected from the floor.

* * * * *